(12) United States Patent
Davenport et al.

(10) Patent No.: US 12,208,874 B1
(45) Date of Patent: Jan. 28, 2025

(54) DRIVESHAFT ASSEMBLY FOR A MARINE ENGINE ASSEMBLY

(71) Applicant: BRP US INC., Sturtevant, WI (US)

(72) Inventors: Mike Davenport, Burlington, WI (US); John J. Valek, Burlington, WI (US); Michael James LaValley, Greenfield, WI (US)

(73) Assignee: BRP US Inc.

( * ) Notice: Subject to any disclaimer, the term of this patent is extended or adjusted under 35 U.S.C. 154(b) by 518 days.

(21) Appl. No.: 17/682,378

(22) Filed: Feb. 28, 2022

Related U.S. Application Data

(60) Provisional application No. 63/154,161, filed on Feb. 26, 2021.

(51) Int. Cl.
| | | |
|---|---|---|
| *B63H 20/14* | (2006.01) | |
| *B63H 20/10* | (2006.01) | |
| *B63H 20/12* | (2006.01) | |
| *B63H 20/32* | (2006.01) | |
| *B63H 23/04* | (2006.01) | |
| *B63H 23/06* | (2006.01) | |
| *B63H 23/34* | (2006.01) | |

(Continued)

(52) U.S. Cl.
CPC ............ *B63H 20/14* (2013.01); *B63H 20/10* (2013.01); *B63H 20/12* (2013.01); *B63H 20/32* (2013.01); *B63H 23/04* (2013.01); *B63H 23/06* (2013.01); *B63H 23/34* (2013.01); *F16H 57/0025* (2013.01); *B63H 2020/323* (2013.01); *F16H 57/0471* (2013.01); *F16H 57/0495* (2013.01)

(58) Field of Classification Search
CPC ........ B63H 20/14; B63H 20/10; B63H 20/12; B63H 20/32; B63H 23/04; B63H 23/06; B63H 23/34; B63H 2020/323; F16H 57/0025; F16H 57/0471; F16H 57/0495
See application file for complete search history.

(56) References Cited

U.S. PATENT DOCUMENTS 3,430,604 A * 3/1969 Cooper .................. B63H 20/22
440/75
3,994,254 A * 11/1976 Woodfill ................ B63H 11/00
440/3

(Continued)

FOREIGN PATENT DOCUMENTS

DE         2621372 A  * 11/1977  ............. B63H 23/04

*Primary Examiner* — Andrew Polay
(74) *Attorney, Agent, or Firm* — BCF LLP

(57) ABSTRACT

A marine engine assembly has a housing; an internal combustion engine having a crankshaft; and a driveshaft assembly driven by the crankshaft. The driveshaft assembly has: a first driveshaft having a first end operatively connected to the crankshaft; a second driveshaft having a first end connected to a second end of the first driveshaft, the first end of the second driveshaft being rotationally fixed relative to the second end of the first driveshaft, the first and second driveshafts being concentric, one of the first and second driveshafts being disposed at least in part inside another one of the first and second driveshafts, the second driveshaft extending from its first end toward the first end of the first driveshaft; and a third driveshaft having a first operatively connected to the second driveshaft. The marine engine assembly also has a propulsion device operatively connected to a second end of the third driveshaft.

21 Claims, 12 Drawing Sheets

(51) Int. Cl.
*F16H 57/00* (2012.01)
*F16H 57/04* (2010.01)

(56) References Cited

U.S. PATENT DOCUMENTS

| | | | |
|---|---|---|---|
| 5,425,663 A * | 6/1995 | Meisenburg | C23F 13/10 |
| | | | 440/76 |
| 7,736,206 B1 | 6/2010 | McChesney et al. | |
| 9,499,247 B1 | 11/2016 | Wiatrowski et al. | |
| 11,180,235 B2 | 11/2021 | Wiatrowski | |
| 2021/0001968 A1* | 1/2021 | Ikegaya | B63H 20/14 |
| 2021/0206463 A1* | 7/2021 | Thum | B63H 23/10 |

* cited by examiner

DRIVESHAFT ASSEMBLY FOR A MARINE ENGINE ASSEMBLY

CROSS-REFERENCE

The present application claims priority to U.S. Provisional Patent Application No. 63/154,161, filed Feb. 26, 2021.

TECHNICAL FIELD

The present technology relates to marine engine assemblies and more specifically to a driveshaft assembly for a marine engine assembly.

BACKGROUND

A typical marine outboard engine has an internal combustion engine disposed inside an engine housing, a gearcase supporting a propeller, and a midsection extending between the engine housing and the gearcase.

The outboard motor assembly is generally connected to a watercraft by a transom or mounting bracket, typically connected to the midsection, below the engine. The bracket connects to a rear portion of the watercraft, such that the engine and part of the midsection are well above the water during normal operation. In some cases, however, it could be preferable to have a marine engine assembly which is disposed lower relative to the watercraft to allow more useable room at the rear of the watercraft for example.

However, by positioning a typical marine outboard motor lower, the propeller may now extend too deeply in the water, thereby compromising shallow water operation of the watercraft.

One solution could consist in reducing a length of the midsection or in eliminating the midsection altogether. However, this creates a number of problems.

One of these problems is caused by torque variations that are inherent from the combustion cycle of internal combustion engines. In a typical marine outboard engine, a driveshaft operatively connects the engine to the components in the gearcase. The driveshaft extends inside the midsection and this length allows the driveshaft to provide a degree of torsional compliance to dampen the torque variations from the engine created during the combustion cycle. As a result, the driveshaft protects the transmission component in the gear case and the propeller assembly from the torque variations of the engine.

By reducing the length of the midsection or by eliminating the midsection altogether, the distance that the driveshaft can span is much shorter. As a result, for the same diameter, a shorter driveshaft does not twist as much and therefore provides less damping of the torque variations from the engine.

One solution could be to provide a driveshaft having a smaller diameter, which would therefore twist more, but such a driveshaft may not resist the magnitude of torque that need to be transmitted and could fail prematurely.

Another solution could be to strengthen the transmission component in the gearcase and the propeller assembly to make them more resistant to torque variations. However, this results in bigger and heavier components requiring a bigger gearcase. This increase in size and weight is detrimental to the performance on the marine engine. Such components are also more expensive.

Another solution could be to add conventional torsional dampers between the engine and the drive shaft and/or between the driveshaft and the transmission components in the gearcase. Such torsional dampers include elastomeric elements or metal coil springs for example. However, these torsional damper require space to be installed, add weight and increase cost.

Therefore, there is a desire for a marine engine assembly having feature that can dampen the torque variations from the engine to the transmission components while occupying little space.

SUMMARY

It is an object of the present technology to ameliorate at least some of the inconveniences present in the prior art.

According to one aspect of the present technology, there is provided a marine engine assembly for a watercraft having a housing; an internal combustion engine disposed in the housing, the internal combustion engine having a crankshaft; and a driveshaft assembly driven by the crankshaft. The driveshaft assembly has: a first driveshaft having a first end and a second end, the first end of the first driveshaft being operatively connected to the crankshaft; a second driveshaft having a first end and a second end, the first end of the second driveshaft being connected to the second end of the first driveshaft, the first end of the second driveshaft being rotationally fixed relative to the second end of the first driveshaft, the first and second driveshafts being concentric, one of the first and second driveshafts being disposed at least in part inside another one of the first and second driveshafts, the second driveshaft extending from its first end toward the first end of the first driveshaft; and a third driveshaft having a first end and a second end, the first end of the third driveshaft being operatively connected to the second driveshaft. The marine engine assembly also has a propulsion device operatively connected to the second end of the third driveshaft In some embodiments of the present technology, the first driveshaft is disposed at least partially inside the second driveshaft.

In some embodiments of the present technology, the third driveshaft is perpendicular to the first and second driveshaft.

In some embodiments of the present technology, a first bevel gear is mounted to the second driveshaft; and a second bevel gear is mounted to the third driveshaft, the second bevel gear engaging and being driven by the first bevel gear.

In some embodiments of the present technology, the first bevel gear is disposed between the first and second ends of the second driveshaft; and the second bevel gear is disposed at the first end of the third driveshaft.

In some embodiments of the present technology, an axis of rotation of the third driveshaft intersects an axis of rotation of the second driveshaft at a position between the first bevel gear and the first end of the second driveshaft.

In some embodiments of the present technology, a first bearing rotationally supports the first end of the second driveshaft in the housing; and a second bearing rotationally supports the second end of the second driveshaft in the housing.

In some embodiments of the present technology, the first bevel gear is closer to the first bearing than the second bearing.

In some embodiments of the present technology, the housing defines a chamber for containing lubricant; and the first bevel gear, the second bevel gear, the first bearing and the second bearing are disposed in the chamber.

In some embodiments of the present technology, the housing has: an outer housing; an inner housing disposed in the outer housing; a cover removably connected to the outer housing; and a gearcase connected to a bottom of the outer housing. The engine is connected to and is supported by the inner housing. The engine and the inner housing are housed in a volume defined between the outer housing and the cover. The inner housing is disposed at least in part between the engine and a front of the outer housing. The chamber is defined by the inner housing.

In some embodiments of the present technology, the third driveshaft extends in part in the chamber and in part in the gearcase.

In some embodiments of the present technology, the housing has: an outer housing; an inner housing disposed in the outer housing; a cover removably connected to the outer housing; and a gearcase connected to a bottom of the outer housing. The engine is connected to and is supported by the inner housing. The engine and the inner housing are housed in a volume defined between the outer housing and the cover. The inner housing is disposed at least in part between the engine and a front of the outer housing.

In some embodiments of the present technology, the first and second driveshafts are disposed in the volume; and the third driveshaft extends in part in the volume and in part in the gearcase.

In some embodiments of the present technology, a steering actuator connected to the front of the outer housing; and a trim actuator connected to the front of the outer housing.

In some embodiments of the present technology, at least one of the first, second, and third driveshafts is perpendicular to the crankshaft.

In some embodiments of the present technology, a propulsion shaft is connected to and drives the propulsion device. The second end of the third driveshaft is operatively connected to the propulsion shaft. The propulsion shaft is parallel to the crankshaft. The third driveshaft is perpendicular to the crankshaft and to the propulsion shaft.

In some embodiments of the present technology, the third driveshaft is perpendicular to the crankshaft, to the first driveshaft and to the second driveshaft.

In some embodiments of the present technology, the crankshaft and the first driveshaft are coaxial.

In some embodiments of the present technology, the first end of the first driveshaft is directly connected to the crankshaft.

In some embodiments of the present technology, a first bevel gear is mounted to the second driveshaft; and a second bevel gear mounted to the third driveshaft, the second bevel gear engaging and being driven by the first bevel gear. The first driveshaft is disposed at least partially inside the second driveshaft; and the second driveshaft extends from its first end toward the crankshaft.

In some embodiments of the present technology, the second end of the second driveshaft is disposed between the first and second ends of the first driveshaft.

For purposes of this application, terms related to spatial orientation such as forward, rearward, upward, downward, left, and right, should be understood in a frame of reference of the marine engine assembly, as it would be mounted to a watercraft with in a neutral trim position. Terms related to spatial orientation when describing or referring to components or sub-assemblies of the engine assembly separately therefrom should be understood as they would be understood when these components or sub-assemblies are mounted in the marine engine assembly, unless specified otherwise in this application.

Explanations and/or definitions of terms provided in the present application take precedence over explanations and/or definitions of these or similar terms that may be found in any documents incorporated herein by reference.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiment of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale.

DETAILED DESCRIPTION

The present technology is described with reference to its use in a marine engine assembly 100 that is used to propel a watercraft and is configured to be disposed under the deck of the watercraft it propels. It is contemplated that the marine engine assembly 100 may be disposed at a transom of a watercraft, but not beneath its deck and that aspects of the present technology could be used in other types of marine engine assemblies, such as in a marine outboard motors having a midsection connected below the engine, a gear case connected below the midsection, and a transom bracket configured to connect the midsection to a watercraft.

Figure 1:
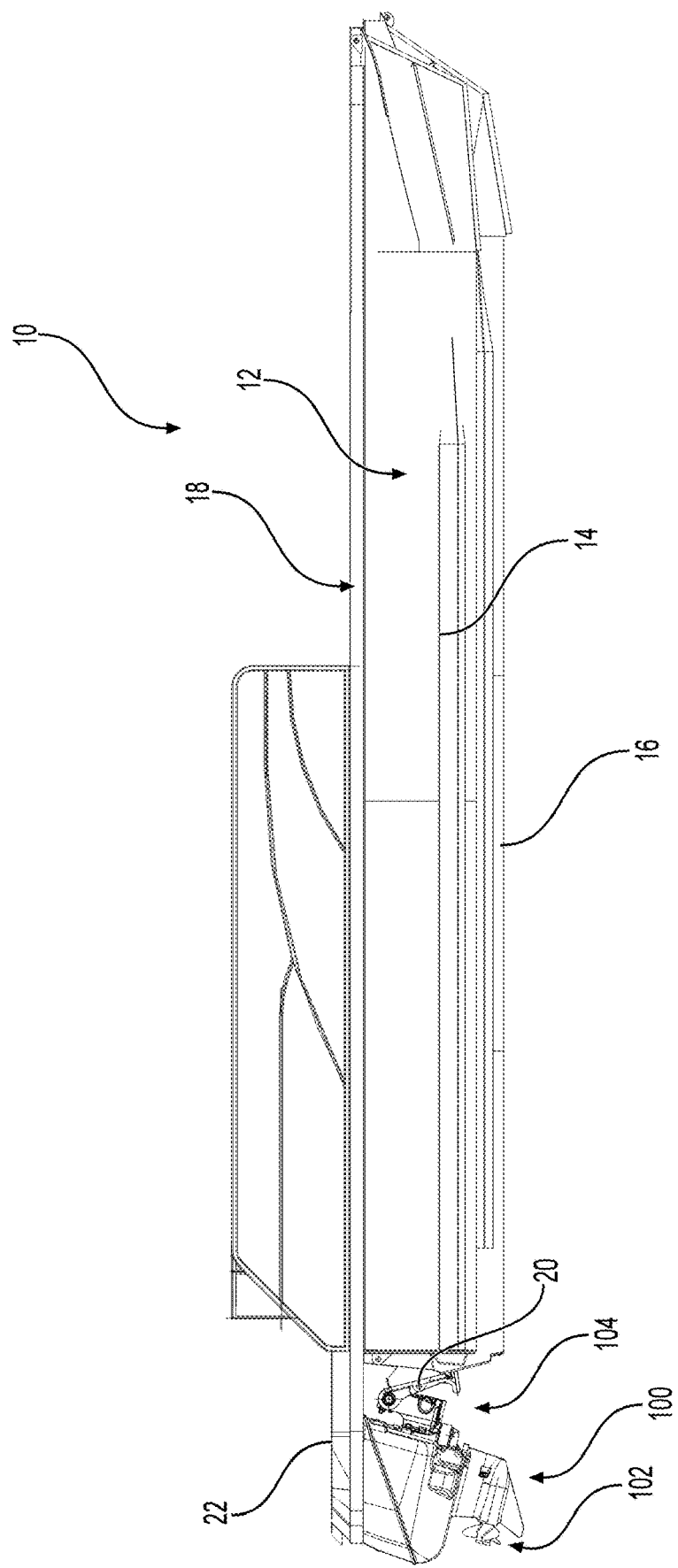
FIG. 1 is a right side elevation view of a watercraft having a marine engine assembly according to the present technology.

In FIG. 1, a watercraft 10 is illustrated. The watercraft 10 illustrated is a pontoon boat 10, but this is one non-limiting example of a watercraft according to the present technology and other types of watercraft are contemplated. This particular embodiment of the boat 10 includes a watercraft body 12 formed generally from two side pontoons 14 (only one being illustrated), a central pontoon 16 and a platform 18.

The boat 10 also includes a marine engine assembly 100, also referred to herein as the assembly 100. The assembly 100 is pivotably and rotatably connected to the watercraft body 12 for providing propulsion via a propulsion device 102. The propulsion device 102 is a propeller 102 in the present embodiment, but it is contemplated that the propulsion device 102 could be different in alternative embodiments. For example, it is contemplated that the propulsion device 102 could be an impeller of a marine jet propulsion device or another type of propeller, such as a ducted propeller.

The assembly 100 includes a transom bracket 104 which is fastened to the watercraft body 12. The transom bracket 104 is connected to a transom 20 of the central pontoon 16, such that the assembly 100 is generally disposed below a top surface 22, also called the deck 22, of the platform 18 laterally between the pontoons 14.

With reference to FIGS. 2 to 5, the marine engine assembly 100, shown separately from the watercraft 10, will now be described in more detail. The assembly 100 includes the propeller 102, the transom bracket 104, a housing 106, an internal combustion engine 108, a driveshaft assembly 110 and other components disposed in the housing 106 some of which will be described in more detail below.

Figure 2:
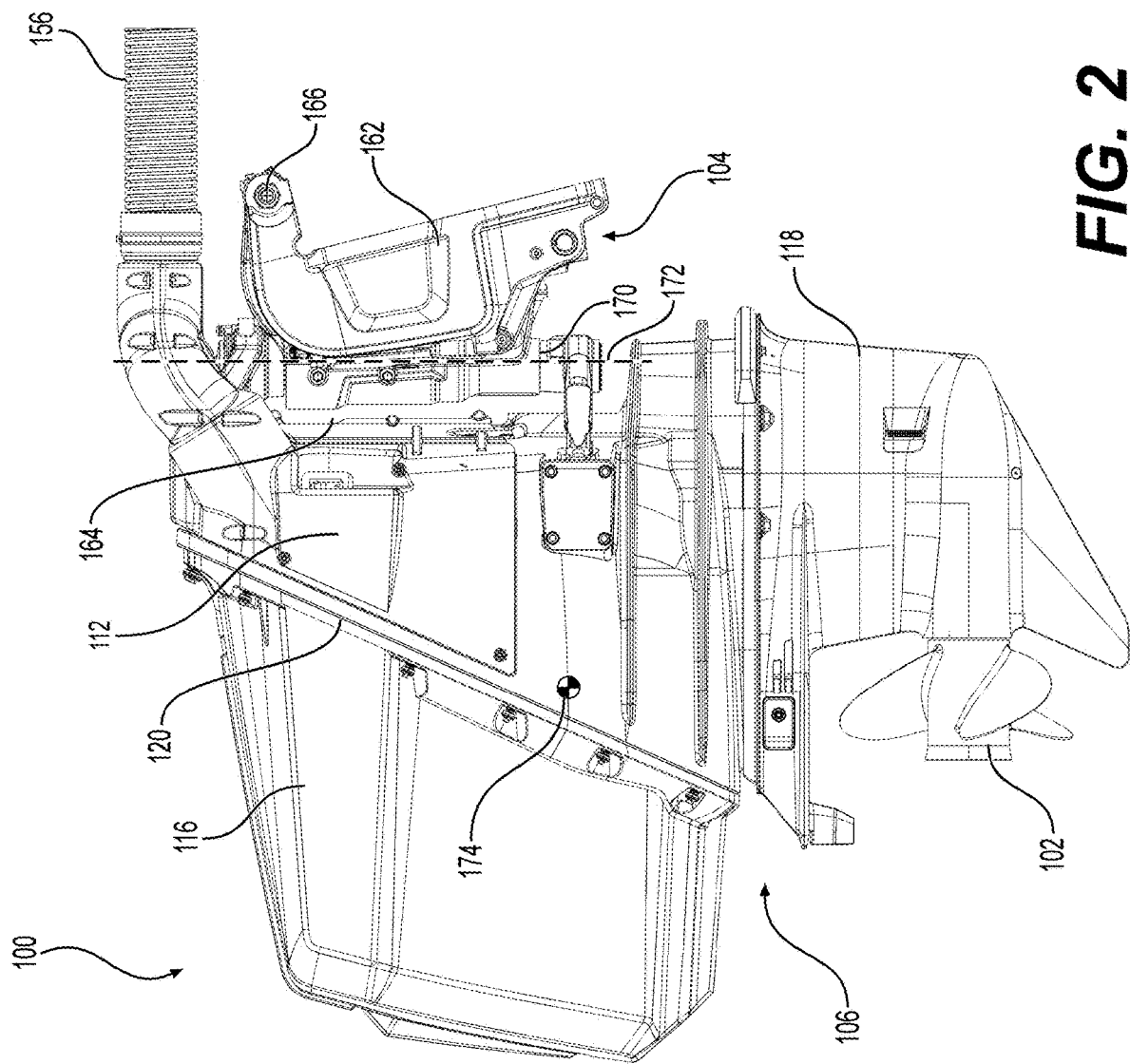
FIG. 2 is a right side elevation view of the marine engine assembly of the watercraft of FIG. 1.
Figure 3:
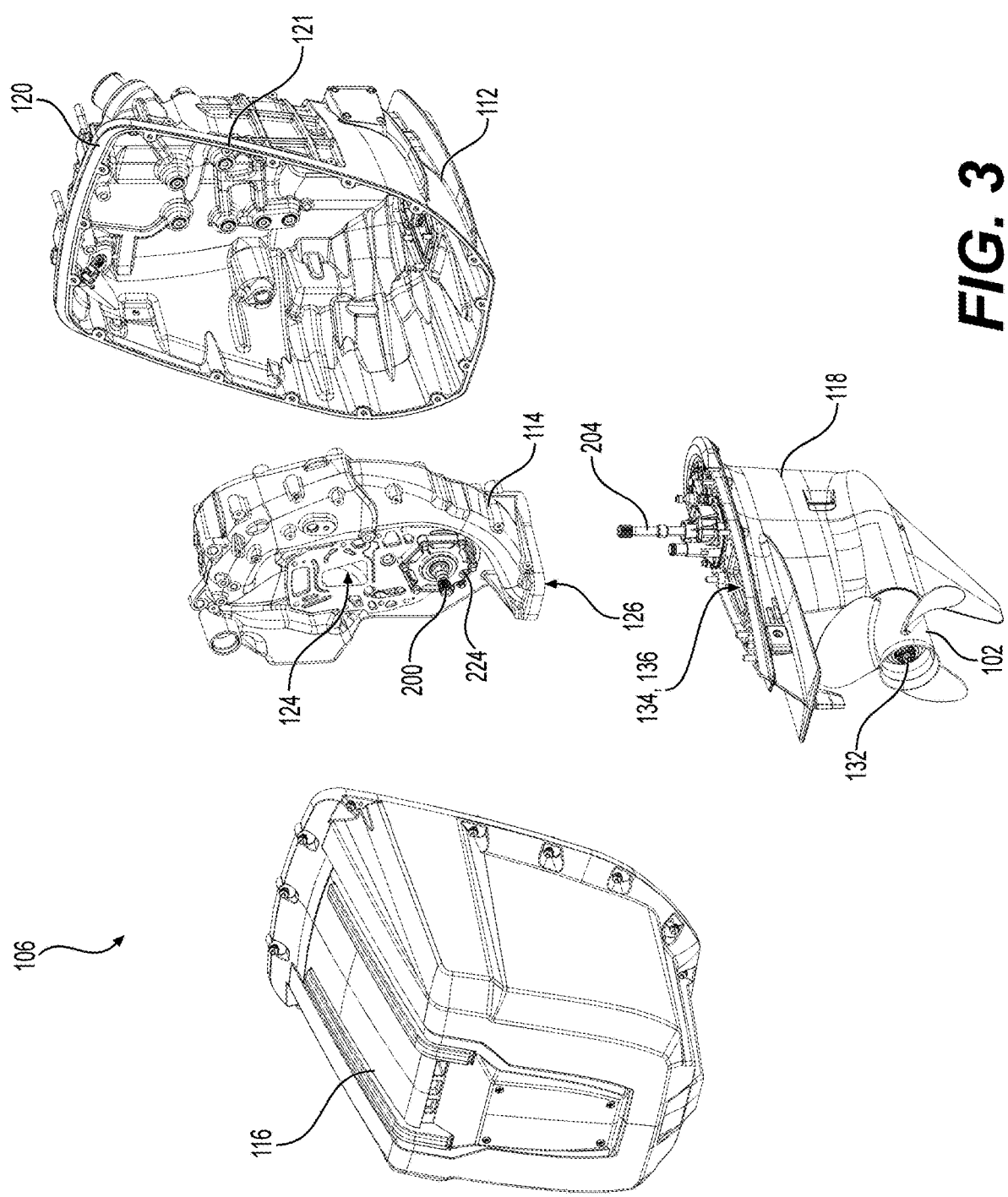
FIG. 3 is an exploded view of a housing of the marine engine assembly of FIG. 2 with a propeller and some drive components present in portions of the housing.
Figure 4:
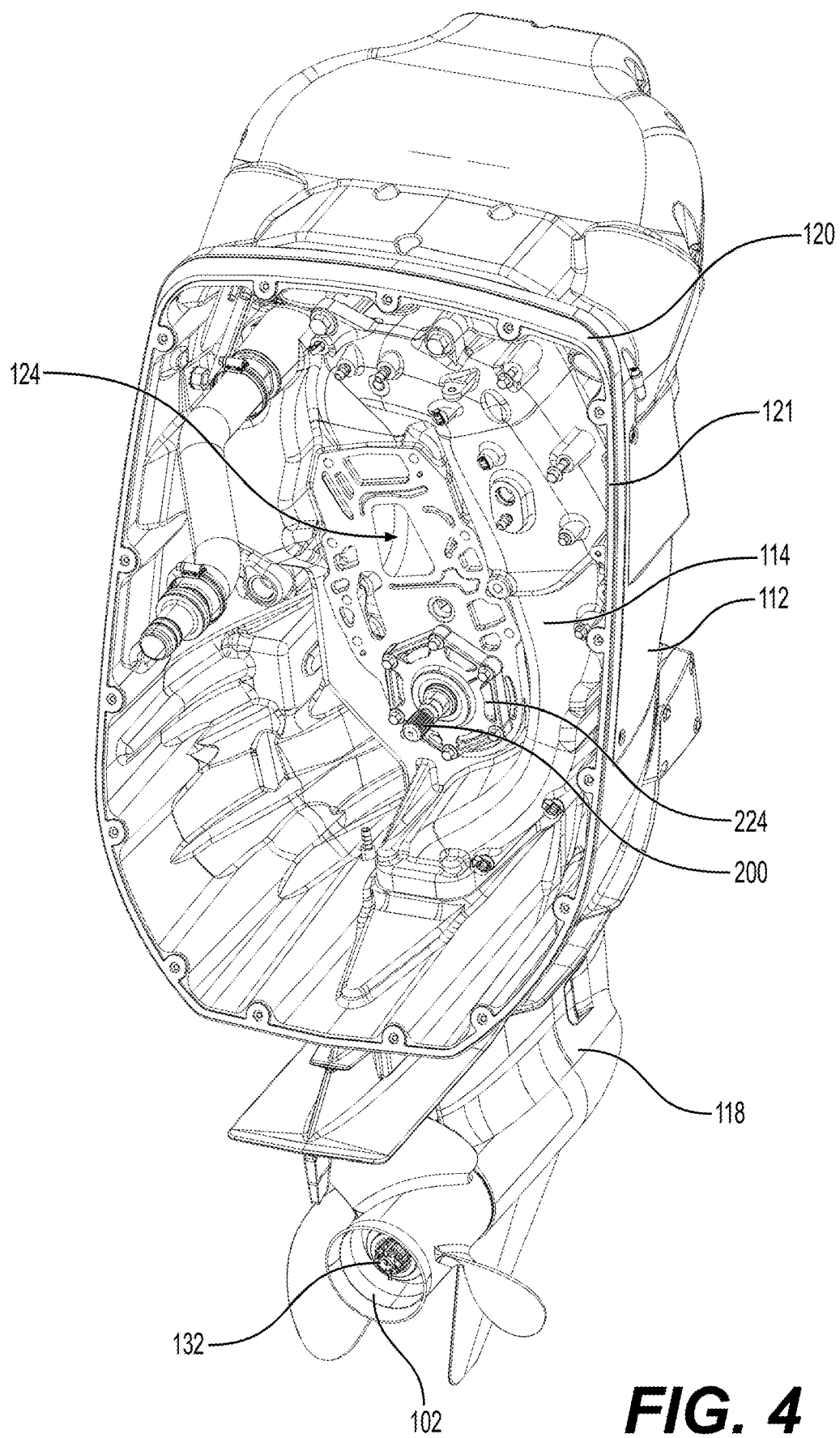
FIG. 4 is a perspective view taken from a rear, right side of the marine engine assembly of FIG. 2, with a cover of the housing, the engine, and other components removed.
Figure 5:
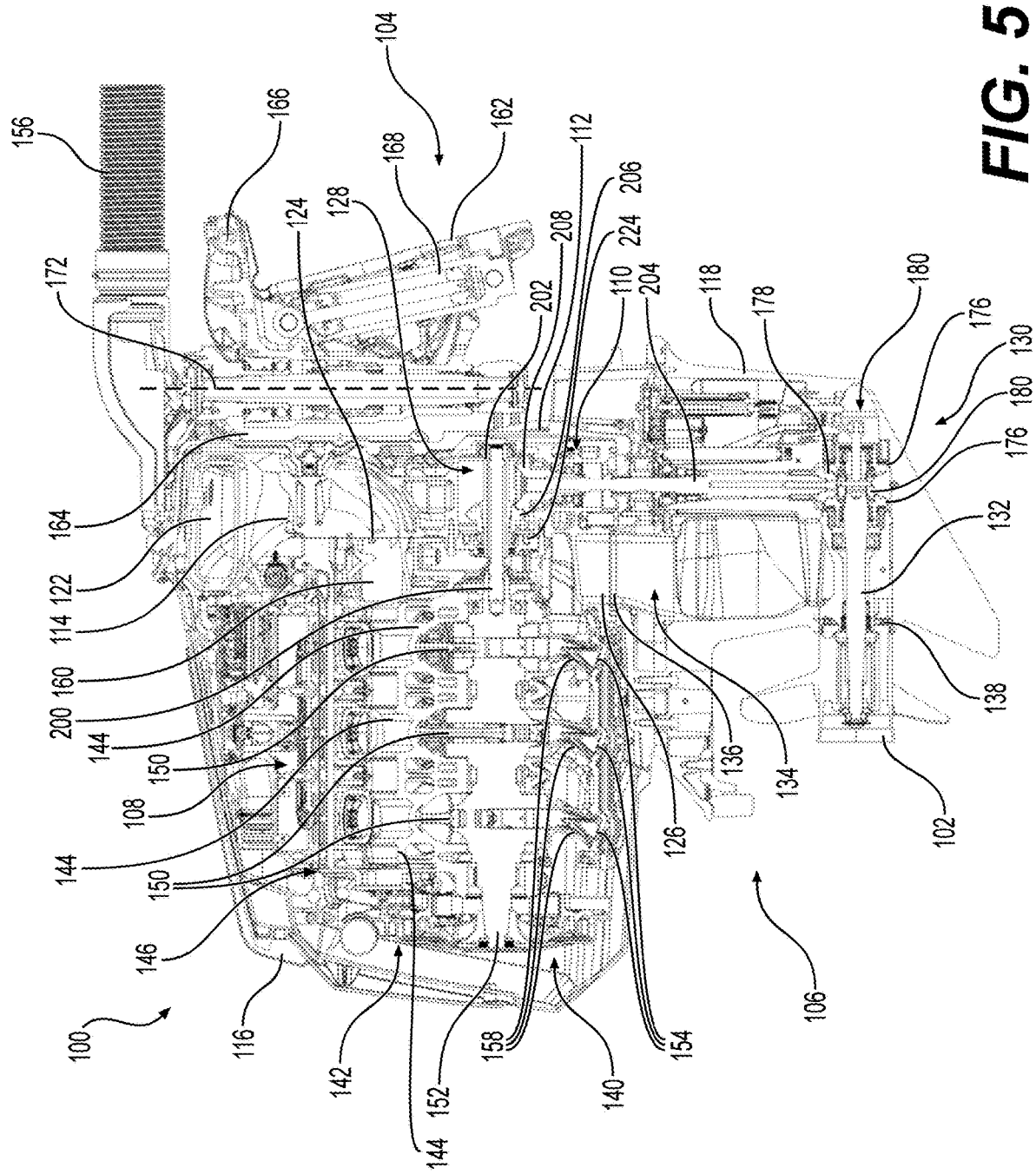
FIG. 5 is a longitudinal cross-section of the marine engine assembly of FIG. 2.

With reference to FIGS. 2 and 3, the housing 106 will be described in more detail. The housing 106 supports and covers components disposed therein. The housing 106 includes an outer housing 112, an inner housing 114, a cover 116 and a gear case 118. The cover 116 is removably connected to the outer housing 112 along a diagonally extending parting line 120. In the present embodiment, the cover 116 is connected to the outer housing 112 using fasteners, but other types of connections, such as clamps or latches are contemplated. A seal 121 (FIG. 3) is provided between the cover 116 and the outer housing 112 along the parting line 120. The cover 116 and the outer housing 112 define a volume therebetween. As best seen in FIG. 4, the inner housing 114 is disposed in the outer housing 112 and is therefore housed in the volume defined between the cover 116 and the outer housing 112. The engine 108 is connected to a back of the inner housing 114 and is supported in the housing 106 by the inner housing 114. As such, the engine 108 is housed in the volume defined between the cover 116 and the outer housing 112. By removing the cover 116, the engine 108 can be accessed. Part of the inner housing 114 is disposed between the engine 108 and a front of the outer housing 112 as best seen in FIG. 5. As seen in FIG. 5, the inner housing 114 defines an exhaust passage 122 having an inlet 124 (FIG. 4) fluidly communicating with exhaust ports (not shown) of the engine 108 and a downward facing outlet 126 at a bottom thereof that fluidly communicates with the gear case 118 as described below. The inner housing 114 also defines a chamber 128 that contains lubricant (not shown) and that houses a portion of the driveshaft assembly 110, as will be described in more detail below. The gear case 118 is connected to a bottom of the outer housing 112. The gear case 118 houses a transmission 130 and a propulsion shaft 132 selectively driven by the transmission. The propulsion shaft 132 is connected to and drives the propeller 102. As in the present embodiment the propulsion shaft 132 drives the propeller 102, it can also be referred to as a propeller shaft 132. The gear case 118 also defines an exhaust passage 134 having an inlet 136 at a top thereof and an outlet 138 at a rear thereof. During operation, exhaust gases flow from the exhaust ports of the engine 108 into the exhaust passage 122 of the inner housing 114 via the inlet 124, then flows out of the exhaust passage 122 via the outlet 126, then into the exhaust passage 134 of the gear case 118 via the inlet 136, the out of the exhaust passage 134 into the propeller 102 via the outlet 138. In the present embodiment, the outer and inner housings 112, 114 are cast metal parts, but other materials and manufacturing methods are contemplated. It is also contemplated that the outer and inner housings 112, 114 could be made as a single integral component, or could be made as more than two components that are then connected together. The cover 116 is made from a composite material, such as a glass fiber and thermoset or thermoplastic resin composite, and the gear case 118 is made from cast aluminum, but other materials are contemplated.

In the present implementation, the internal combustion engine 108 is a three-cylinder, two-stroke, gasoline-powered, direct injected internal combustion engine. It is contemplated that the internal combustion engine 108 could be a four-stroke internal combustion engine. It is contemplated that the engine 108 could have more or less than three cylinders. In some implementations, the internal combustion engine 108 could use a fuel other than gasoline, such as diesel.

With reference to FIG. 5, the engine 108 includes a crankcase 140. A cylinder block 142 defining three cylinders 144 is disposed above the crankcase 108. A cylinder head 146 is disposed on top of the cylinder block 142. Each cylinder 122 has a piston 148 (FIG. 6) reciprocally received inside of it. Each piston 148 is connected by a corresponding connecting rod 150 to a crankshaft 152. The crankshaft 152 rotates in the crankcase 140. For each cylinder 144, the piston 148, the cylinder 144 and the cylinder head 146 define together a combustion chamber. For each combustion chamber, a direct fuel injector (not shown) supported by the cylinder head 146 is provided to inject fuel into the combustion chamber, and a spark plug (not shown) extends into the combustion chamber through the cylinder head 146 to ignite an air-fuel mixture inside the combustion chamber.

The engine 108 includes one air intake 154 per cylinder 144. The air intakes 154 are provided at the bottom of the crankcase 140. Air is delivered to the air intakes 154 by an air intake assembly (not shown). Air is supplied to the air intake assembly by an air intake hose 156. The air passes through reed valves 158 provided in the crankcase 140 adjacent the air intakes 154. The reed valves 158 allow air to enter the crankcase 140 but prevent air from exiting the crankcase 140. For each cylinder 144, a transfer port (not shown) communicates the crankcase 140 with the corresponding combustion chamber for air to be supplied to the combustion chamber.

Each combustion chamber has a corresponding exhaust port (not shown). Exhaust gases flow from the combustion chambers, through the exhaust ports, into an exhaust manifold 160 (partially shown in FIG. 5). Each exhaust port has a corresponding reciprocating exhaust valve (not shown) that varies the effective cross-sectional area and timing of its exhaust port. From the exhaust manifold 160, the exhaust gases are routed out of the marine engine assembly 100 via the exhaust passages 122, 134 and the propeller 102 as described above.

The reciprocation of the pistons 148 causes the crankshaft 152 to rotate. The crankshaft 152 drives the driveshaft assembly 110, which drives the transmission 130, which drives the propeller shaft 132, which drives the propeller 102, as is described in more detail below. As can be seen in FIG. 5, in the present embodiment the crankshaft 152 and the propeller shaft 132 are parallel to each other. It is contemplated that in alternative embodiments, the engine 108 could be oriented such that the crankshaft 152 extends generally vertically and is therefore perpendicular to the propeller shaft 132.

With reference to FIGS. 2 and 5, the transom bracket 104 includes a watercraft portion 162 which is adapted for fastening to the watercraft body 12. The bracket 104 also includes an engine portion 164, pivotally connected to the watercraft portion 162, and which is fastened to the front of the outer housing 112. The engine portion 164 is pivotable with respect to the watercraft portion 162 about a tilt-trim axis 166. The transom bracket 104 thus defines the tilt-trim axis 166 of the marine engine assembly 100, about which the assembly 100 can be trimmed or tilted relative to the watercraft body 12. The engine portion 164 of the transom bracket 104 includes a tilt and trim actuator 168 for tilting or trimming the assembly 100 relative to watercraft body 12. It is contemplated that the actuator 168 could only trim the assembly 100, in which case the actuator 168 would be a trim actuator. In the present embodiment, the tilt and trim actuator 168 is a linear hydraulic actuator adapted for pushing the engine portion 164 away from the watercraft portion 162, but other types of tilt and trim actuators 168 are contemplated, such as those described in U.S. Pat. No. 11,180,235 B2, issued on Nov. 23, 2021 and entitled "Stern and Swivel Bracket Assembly for Mounting a Drive Unit to a Watercraft", U.S. Pat. No. 7,736,206 B1, issued on Jun. 15, 2010 and entitled "Integrated Tilt trim and Steering Subsystem for Marine Outboard Engines", and U.S. Pat. No. 9,499,247 B1, issued on Nov. 22, 2016 and entitled "Marine Outboard Engine Having a Tilt trim And Steering Bracket Assembly", the entirety of each of which is incorporated herein by reference. The engine portion 164 includes a steering actuator 170 configured for steering the housing 106, and therefore the propeller 102, relative to the transom bracket 104 about a steering axis 172. In the present embodiment, the steering actuator 170 is a rotary hydraulic actuator, but other types of steering actuators 170 are contemplated.

As can be seen in FIG. 2, the center of gravity 174 of the engine 108 is disposed below the tilt-trim axis 166, when the assembly 100 is in a trim range. As the assembly 100 is designed to be disposed below the deck 18, the engine 108 and the transom bracket 104 partially vertically overlap, rather than the engine 108 being disposed well above the bracket 104 as would be the case in a conventional outboard engine assembly meant to extend higher relative to the watercraft body 12. In the present embodiment, the center of gravity 174 is vertically between a top end of the transom bracket 104 and a bottom end of the transom bracket 104.

Turning back to FIG. 5, the transmission 130 and its connection to the propeller shaft 132 will be described in more detail. The transmission 130 includes two bevel gears 176 rotationally supported on a front portion of the propeller shaft 132. The front and rear bevel gears 176 are driven by a pinion gear 178 provided on a lower end of the driveshaft assembly 110. In the present embodiment, the pinion gear 178 is a bevel gear. The front bevel gear 176 is disposed in front of an axis of rotation of the pinion gear 178 and the rear bevel gear 176 is disposed behind the axis of rotation of the pinion gear 178. As a result, the two bevel gears 176 rotate in opposite directions. A dog-clutch assembly 180 selectively rotationally fixes one or the other of the bevel gears 176 to the propeller shaft 132, thereby determining a direction of rotation of the propeller shaft 132 and propeller 102. The dog-clutch assembly 180 includes a dog 182. The dog 182 is rotationally fixed to the propeller shaft 132 and is axially slidable along the propeller shaft 132. By sliding the dog 182 rearward, the dog 182 engages the rear bevel gear 176 such that the rear bevel gear 176 drives the propeller shaft 132. By sliding the dog 182 forward, the dog 182 engages the front bevel gear 176 such that the front bevel gear 176 drives the propeller shaft 132. By sliding the dog 182 between the bevel gears 176 such that the dog 182 does not engage either one of the bevel gears 176, the transmission 130 is said to be in a neutral position. In the neutral position, the propeller shaft 132 is not driven by the bevel gears 176.

Figure 6:
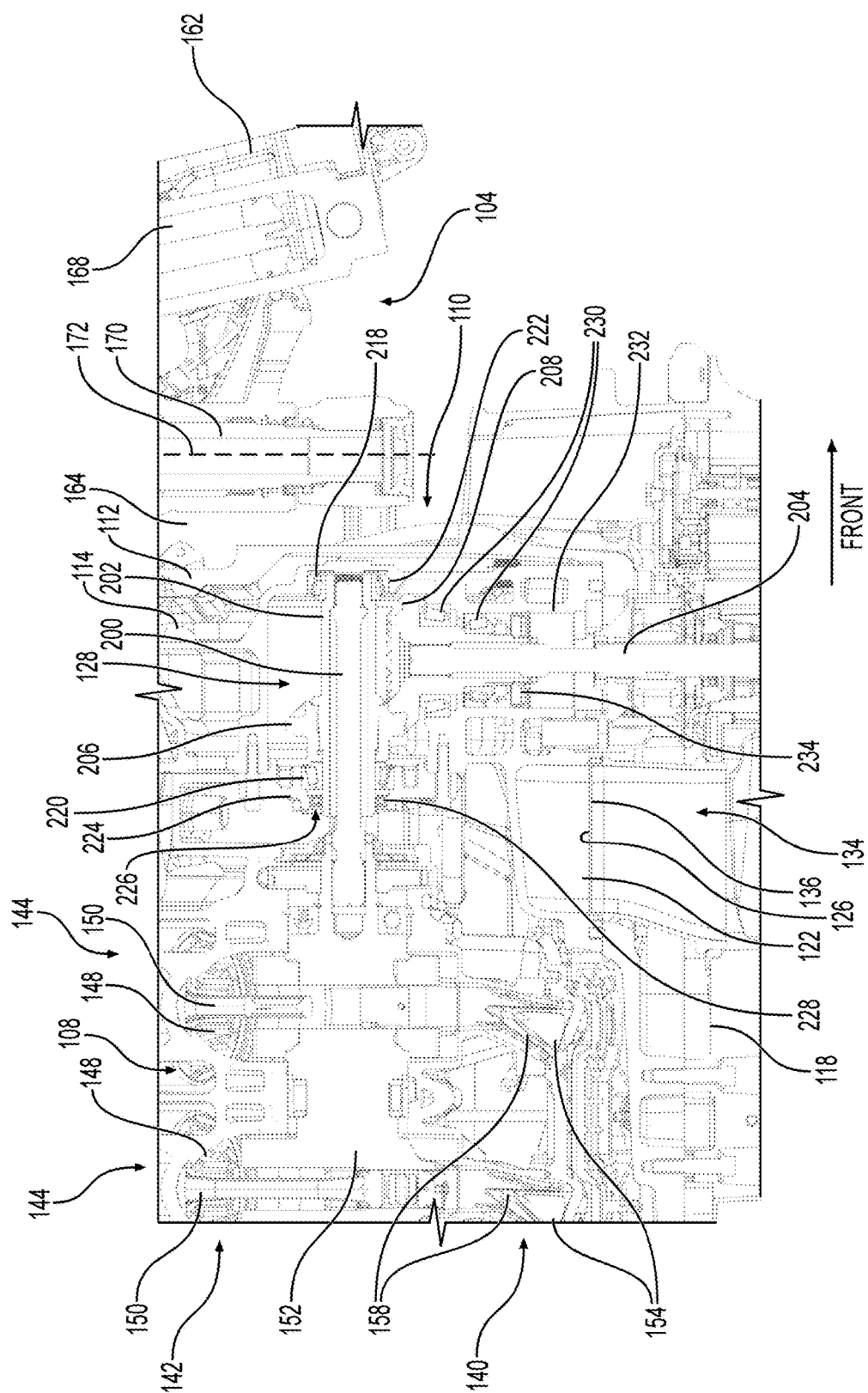
FIG. 6 is a close-up of a portion of the cross-section of FIG. 5 where a driveshaft assembly of the marine engine assembly is located.
Figure 7:
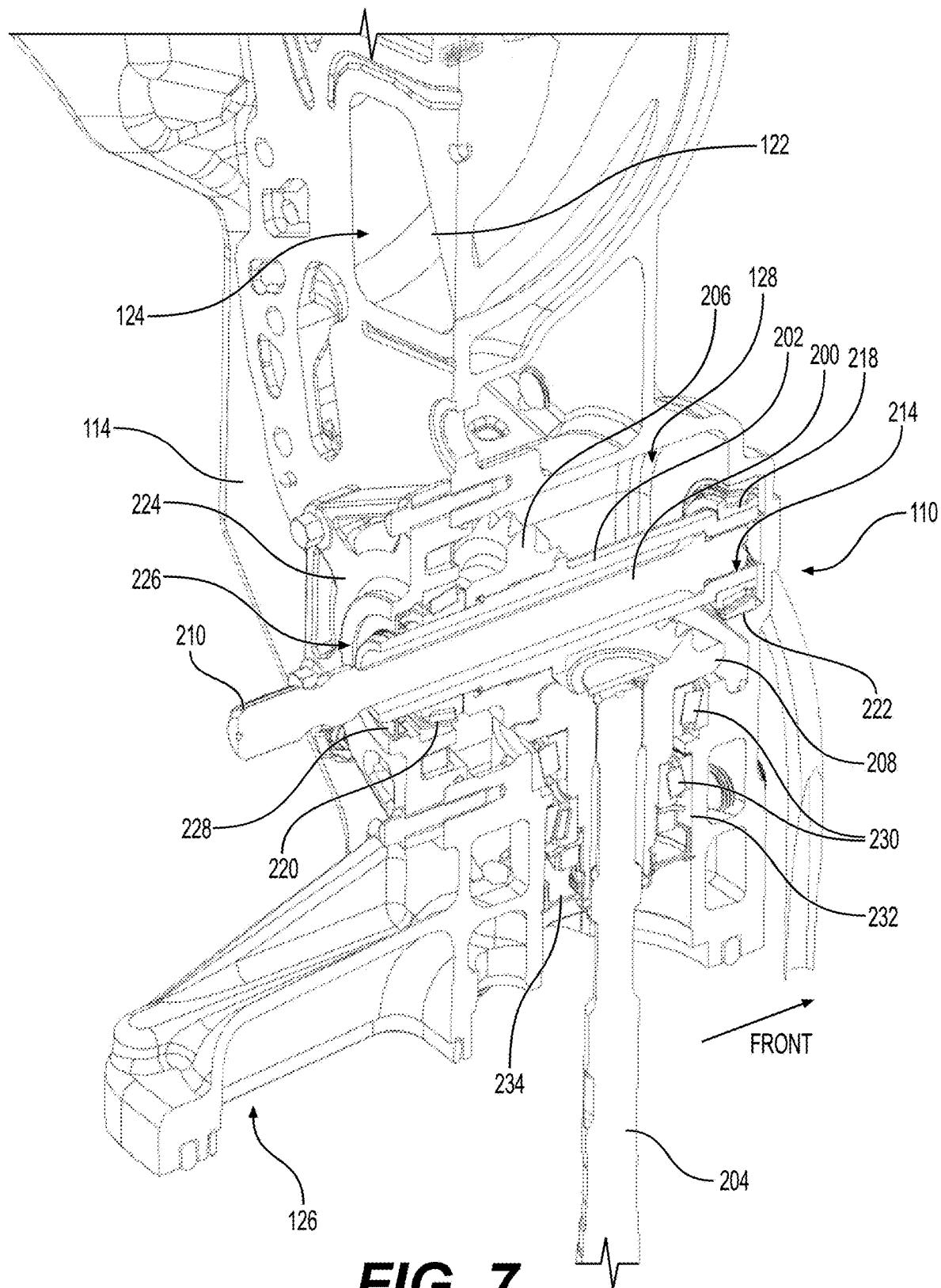
FIG. 7 is a perspective view taken from a rear, right side of a longitudinal cross-section of a portion of an inner housing and of a portion of the driveshaft assembly of FIG. 6.
Figure 8:
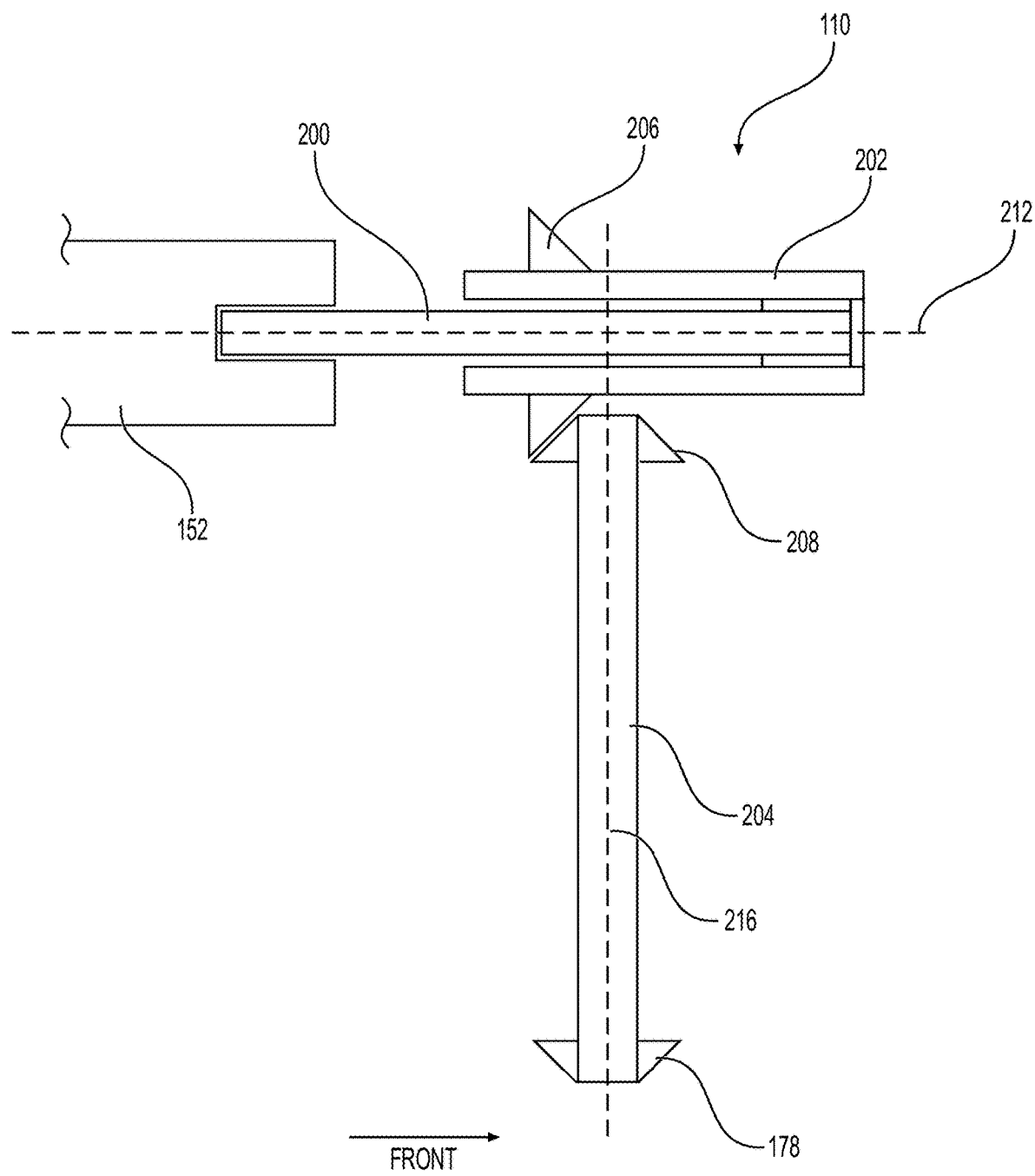
FIG. 8 is a schematic longitudinal cross-section of a crankshaft and the driveshaft assembly of FIG. 6.

Turning now to FIGS. 6 to 8, the driveshaft assembly 110 will be described in more detail. The driveshaft assembly 110 has three driveshafts 200, 202, 204 and three gears 206, 208, 178.

The driveshaft 200 is coaxial with the crankshaft 152. The driveshaft 200 has a rear end received in the front end of the crankshaft 152 directly connected to the crankshaft 152 by splines 210 (FIG. 7) such that the crankshaft 152 drives the driveshaft 200. It is contemplated that the driveshaft 200 could connect to the crankshaft by means other than splines 210, such as by threads for example. It is contemplated that in alternative embodiments, the crankshaft 152 could extend generally vertically, such that the crankshaft 152 would be perpendicular to the driveshaft 200 and would drive the driveshaft 200 via bevel gears for example. It is also contemplated that in alternative embodiments, the crankshaft 152 and the driveshaft 200 could be parallel to each other such that the crankshaft 152 would drive the driveshaft 200 via spur gears, helical gears or a chain drive for example. It is also contemplated that one or more intermediate shafts could be provided between the crankshaft 152 and the driveshaft 200 to operatively connect the crankshaft 152 to the driveshaft 200. It is also contemplated that the crankshaft 152 and the driveshaft 200 could be integrally formed as a single shaft.

The driveshaft 200 is disposed in part inside the driveshaft 202, which is tubular, such that the driveshafts 200, 202 are concentric. As such, the driveshafts 200, 202 and the crankshaft 152 are coaxial and rotate about a common axis of rotation 212 (FIG. 8). Also, the driveshafts 200, 202 are parallel to the propeller shaft 132. As best seen in FIG. 7, the front end of the driveshaft 200 is connected to the front end of the driveshaft 202 by threads 214 such that the driveshaft 200 drives the driveshaft 202. The direction of the threads 214 is selected such that during operation the front ends of the driveshafts 200, 202 are rotationally fixed relative to each other. It is contemplated that the front ends of the driveshafts 200, 202 could be connected to each other by means other than threads 214, such as by splines for example. From its front end, the driveshaft 202 extends rearward toward the rear end of the driveshaft 200 and the crankshaft 152. As can be seen, the driveshaft 202 is shorter than the driveshaft 200. As such, the driveshaft 200 extends rearwardly out of the driveshaft 202, and the rear end of the driveshaft 202 is longitudinally between the front and rear ends of the driveshaft 200.

The bevel gear 206 is mounted to the driveshaft 202 between the front and rear ends of the driveshaft 202. The bevel gear 206 is mounted to the driveshaft 202 by splines, but other means are contemplated. The driveshaft 204 extends perpendicularly to the crankshaft 152, the driveshafts 200, 202, and the propeller shaft 132. The driveshaft 204 is below the driveshafts 200, 202. The bevel gear 208 is mounted to the upper end of the driveshaft 204 and engages the bevel gear 206 such that the driveshaft 202 drives the driveshaft 204 via the bevel gears 206, 208. As can be seen in FIG. 8, an axis of rotation 216 of the driveshaft 204 is perpendicular to the axis of rotation 212 of the crankshaft 152 and the driveshafts 200, 202. The axis of rotation 216 intersects the axis of rotation 212 at a position between the bevel gear 206 and the front end of the driveshaft 202. As can also be seen, the driveshafts 200, 202 extend forward and rearward of the axis of rotation 216. The pinion gear 178 is mounted to the lower end of the driveshaft 204 and drives the transmission 130, which in turn selectively drives the propeller shaft 132 and the propeller 102.

By providing the driveshaft 202 concentrically about the driveshaft 200, the driveshaft assembly 110 provides more torsional compliance in the space available than a driveshaft assembly without the driveshaft 202 where the driveshaft 204 would be driven via bevel gears from the driveshaft 200 (or from the crankshaft 152 should the driveshaft 200 also be omitted), thereby providing more damping of torque variations from the engine 108 while maintaining a relatively compact arrangement.

With reference to FIGS. 5 to 7, it can be seen that the driveshafts 200, 202 are disposed completely inside the volume defined between the cover 116 and the outer housing 112 and that an upper portion the driveshaft 204 is disposed in this volume. More specifically, the driveshafts 200, 202 extend in part inside the chamber 128 defined by the inner housing 114, and the driveshaft 204 extends in part in the chamber 128 and in part in the gear case 118. As can also be seen, the bevel gears 206, 208 are disposed inside the chamber 128.

The front and rear ends of the driveshaft 202 are rotationally supported in the inner housing 114 by front and rear bearings 218, 220. The front bearing 218 is disposed radially between the front end of the driveshaft 202 and a side wall 222 of a recess defined in the inner housing 114. The rear bearing 220 is disposed radially between the driveshaft 202 and a cover 224. The cover 224 is fastened to a rear side of the inner housing 114 to define a rear side of the chamber 128. The cover defines an aperture 226 through which the driveshafts 200, 202 extend. The bevel gear 206 is disposed next to and in front of the rear bearing 220, and is therefore closer to the rear bearing 220 than to the front bearing 218. A seal 228 is disposed radially between the driveshaft 202 and the cover 224, behind the rear bearing 220. The upper end of the driveshaft 204 is rotationally supported in the inner housing 114 by a pair of bearings 230. More specifically, the bearings 230 are disposed radially between the bevel gear 208 and a wall 232 of the inner housing 114 defining a passage for the driveshaft 204. A seal 234 is disposed radially between the bevel gear 208 and the wall 232 below the bearings 230. In the present embodiment, the bearings 218, 220, 230 are single row tapered roller bearings. It is contemplated that the bearings 218, 220, 230 could be of a different type and that not all of the bearings 218, 220, 230 are of the same type. The bearings 218, 220, 230 are disposed in the chamber 128. The chamber contains lubricant (not shown) that lubricates the bearings 218, 220, 230 and the bevel gears 206, 208 during operation.

Turning now to FIGS. 9 to 12, various alternative embodiments of the driveshaft assembly 110 will be described. In these embodiments, two or more driveshaft are concentric thus providing an acceptable degree of damping of torque variations from the engine 108 while maintaining a relatively compact arrangement.

Figure 9:
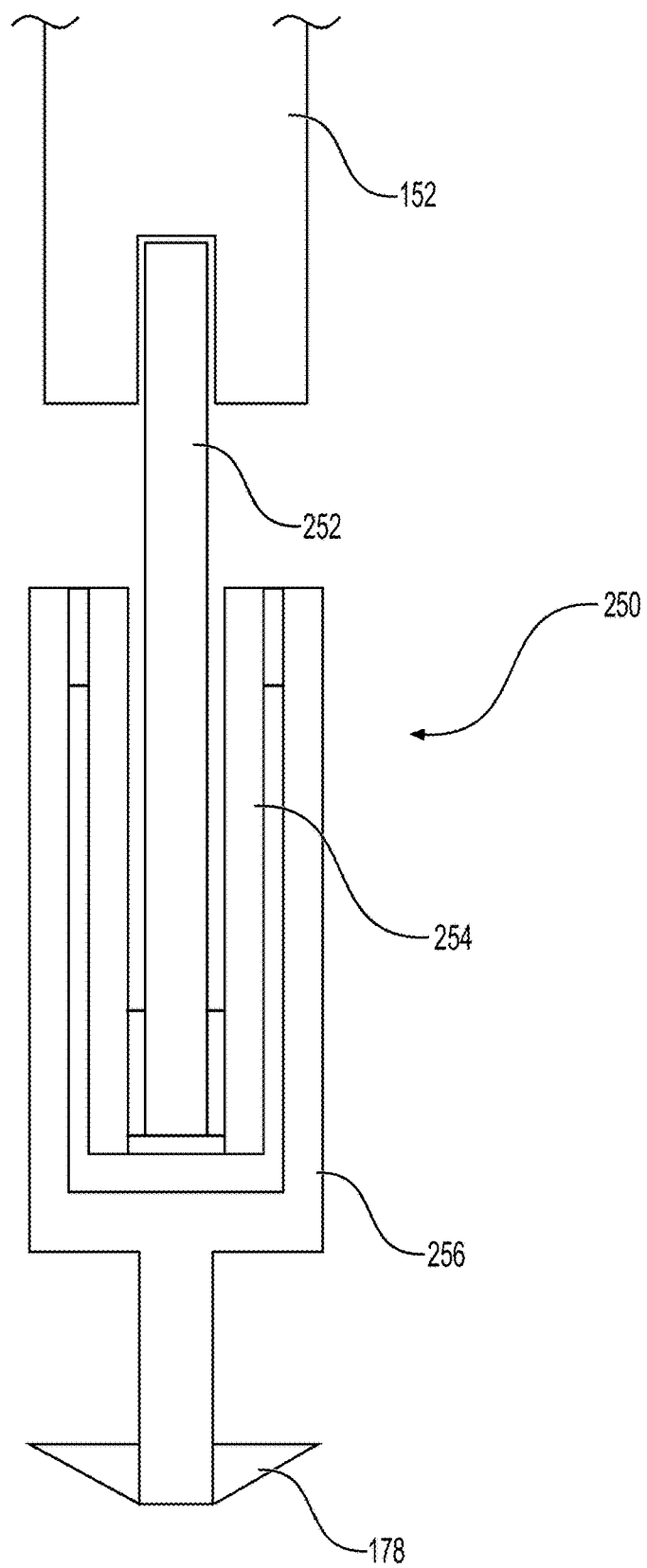
FIG. 9 is a schematic longitudinal cross-section of an alternative embodiment of the crankshaft and the driveshaft assembly of FIG. 8.

FIG. 9 illustrates a driveshaft assembly 250 having driveshafts 252, 254, 256 and the pinion gear 178. The upper end of the driveshaft 252 is connected to and driven by the crankshaft 152, which extends vertically in the present embodiment. In the present embodiment, the crankshaft 152 and the driveshaft 252 are coaxial, but it is contemplated that the crankshaft 152 and the driveshaft 252 could be perpendicular, parallel or at another angle relative to each other with corresponding mechanisms for driving the driveshaft 252 from the crankshaft 152. The driveshaft 252 extends inside the driveshaft 254 and is concentric with the driveshaft 254. The lower end of the driveshaft 252 is connected to and is rotationally fixed relative to the lower end of the driveshaft 254. The driveshaft 254 extends inside a hollow portion of the driveshaft 256 and is concentric with the hollow portion of the driveshaft 256. The upper end of the driveshaft 254 is connected to and is rotationally fixed relative to the upper end of the driveshaft 256. The pinion gear 178 is connected to the lower end of the driveshaft 256. Although not shown, the pinion gear 178 drives the transmission 130, which selectively drives the propeller shaft 132. The propeller shaft 132 is perpendicular to the driveshafts 252, 254, 256.

Figure 10:
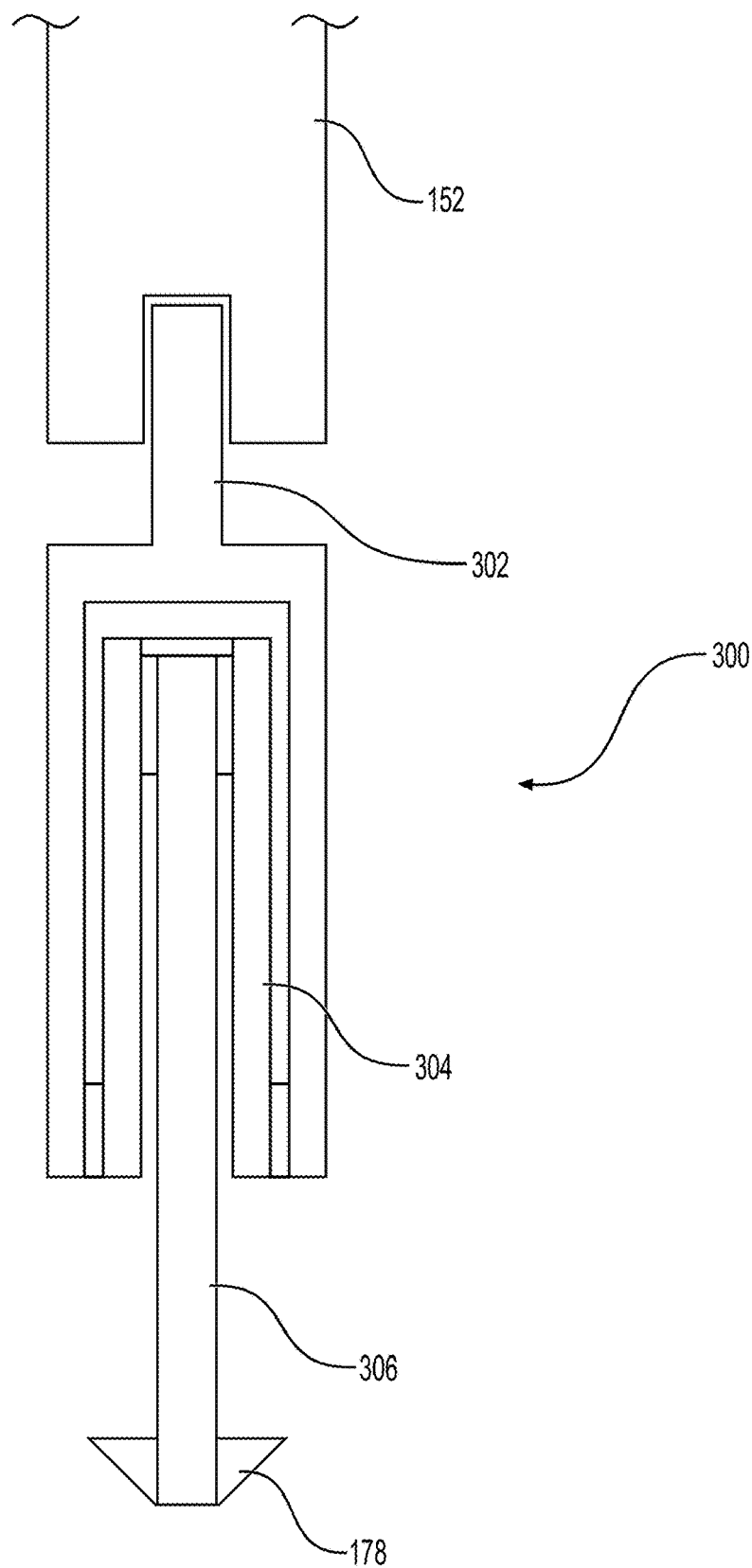
FIG. 10 is a schematic longitudinal cross-section of an alternative embodiment of the crankshaft and the driveshaft assembly of FIG. 8.

FIG. 10 illustrates a driveshaft assembly 300 having driveshafts 302, 304, 306 and the pinion gear 178. The upper end of the driveshaft 302 is connected to and driven by the crankshaft 152, which extends vertically in the present embodiment. In the present embodiment, the crankshaft 152 and the driveshaft 302 are coaxial, but it is contemplated that the crankshaft 152 and the driveshaft 302 could be perpendicular, parallel or at another angle relative to each other with corresponding mechanisms for driving the driveshaft 302 from the crankshaft 152. The driveshaft 304 extends inside a hollow portion of the driveshaft 302 and is concentric with the hollow portion of the driveshaft 302. The lower end of the driveshaft 302 is connected to and is rotationally fixed relative to the lower end of the driveshaft 304. The driveshaft 306 extends inside the driveshaft 304 and is concentric with the driveshaft 304. The upper end of the driveshaft 304 is connected to and is rotationally fixed relative to the upper end of the driveshaft 306. The pinion gear 178 is connected to the lower end of the driveshaft 306. Although not shown, the pinion gear 178 drives the transmission 130, which selectively drives the propeller shaft 132. The propeller shaft 132 is perpendicular to the driveshafts 302, 304, 306.

Figure 11:
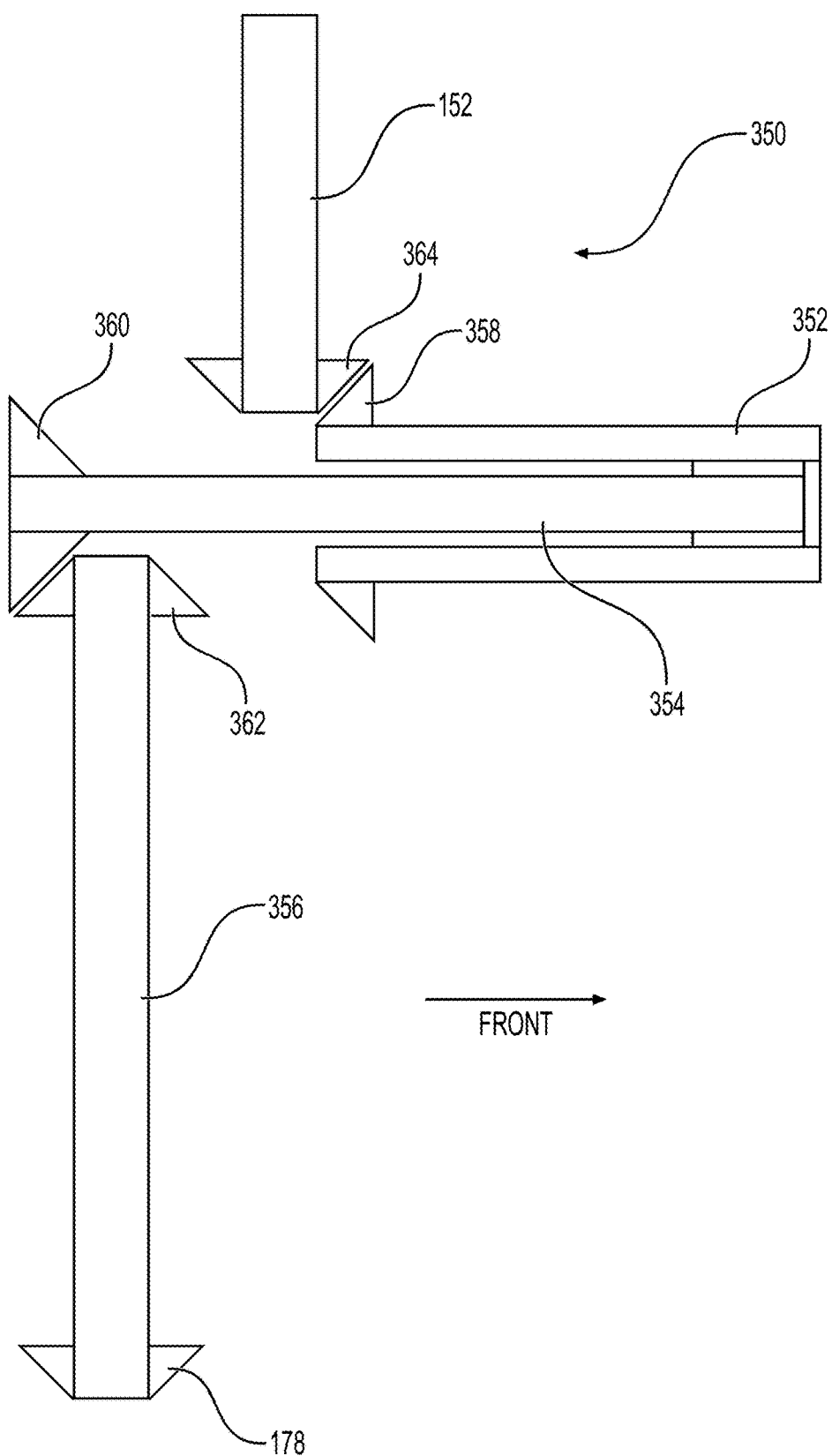
FIG. 11 is a schematic longitudinal cross-section of an alternative embodiment of the crankshaft and the driveshaft assembly of FIG. 8.

FIG. 11 illustrates a driveshaft assembly 350 having driveshafts 352, 354, 356, bevel gears 358, 360, 362 and the pinion gear 178. The bevel gear 358 is mounted to a rear end of the driveshaft 352. The bevel gear 360 is mounted to a rear end of the driveshaft 354. The bevel gear 362 is mounted to the upper end of the driveshaft 356. A bevel gear 364 is mounted to the end of the crankshaft 152. The rear end of the driveshaft 352 is connected to and driven by the crankshaft 152 via the bevel gears 358, 364, which extends vertically in the present embodiment. In the present embodiment, the crankshaft 152 and the driveshaft 352 are perpendicular, but it is contemplated that the crankshaft 152 and the driveshaft 352 could be parallel to each other with corresponding mechanisms for driving the driveshaft 352 from the crankshaft 152. The driveshaft 354 extends inside the driveshaft 352 and is concentric with the driveshaft 352. The front end of the driveshaft 352 is connected to and is rotationally fixed relative to the front end of the driveshaft 354. The driveshaft 356 is perpendicular to the driveshafts 352, 354. The upper end of the driveshaft 356 is operatively connected to and driven by the driveshaft 354 via the bevel gears 360, 362. The pinion gear 178 is connected to the lower end of the driveshaft 356. Although not shown, the pinion gear 178 drives the transmission 130, which selectively drives the propeller shaft 132. The propeller shaft 132 is perpendicular to the driveshaft 356 and is parallel to the driveshafts 352, 354.

Figure 12:
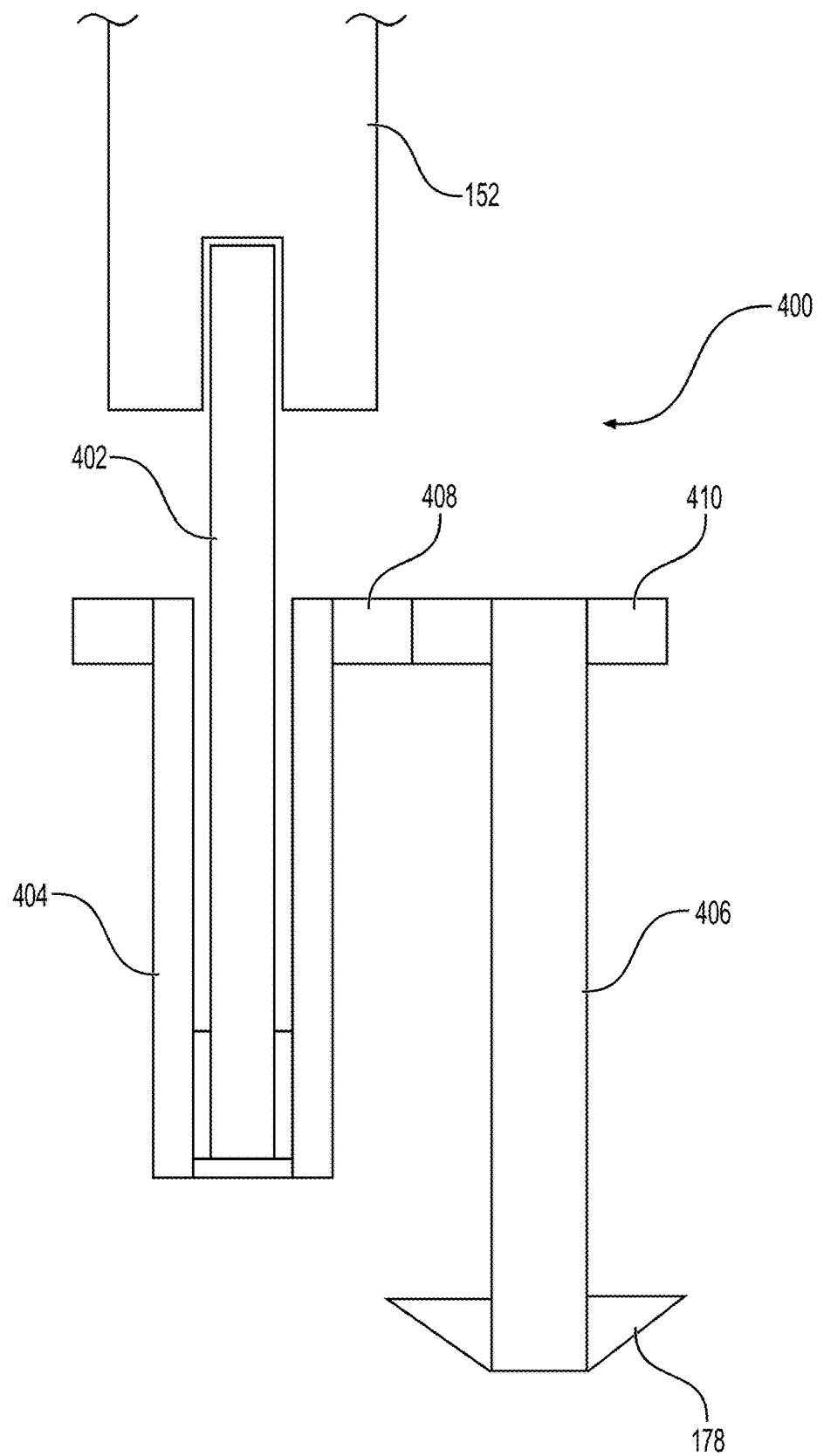
FIG. 12 is a schematic longitudinal cross-section of an alternative embodiment of the crankshaft and the driveshaft assembly of FIG. 8.

FIG. 12 illustrates a driveshaft assembly 400 having driveshafts 402, 404, 406, gears 408, 410 and the pinion gear 178. The gear 408 is mounted to the upper end of the driveshaft 404. The gear 410 is mounted to the upper end of the driveshaft 406. The gears 408, 410 are spur gears, but it is contemplated that the gears 408, 410 could be helical gears. The upper end of the driveshaft 402 is connected to and driven by the crankshaft 152, which extends vertically in the present embodiment. In the present embodiment, the crankshaft 152 and the driveshaft 402 are coaxial, but it is contemplated that the crankshaft 152 and the driveshaft 402 could be perpendicular, parallel or at another angle relative to each other with corresponding mechanisms for driving the driveshaft 402 from the crankshaft 152. The driveshaft 402 extends inside the driveshaft 404 and is concentric with the driveshaft 404. The lower end of the driveshaft 402 is connected to and is rotationally fixed relative to the lower end of the driveshaft 404. The upper end of the driveshaft 406 is operatively connected to and driven by the driveshaft 404 via the gears 408, 410. The pinion gear 178 is connected to the lower end of the driveshaft 406. Although not shown, the pinion gear 178 drives the transmission 130, which selectively drives the propeller shaft 132. The propeller shaft 132 is perpendicular to the driveshafts 402, 404, 406.

Modifications and improvements to the above-described embodiments of the present technology may become apparent to those skilled in the art. The foregoing description is intended to be exemplary rather than limiting.

What is claimed is:

1. A marine engine assembly for a watercraft comprising:
   a housing;
   an internal combustion engine disposed in the housing, the internal combustion engine having a crankshaft;
   a driveshaft assembly driven by the crankshaft, the driveshaft assembly comprising:
     a first driveshaft having a first end and a second end, the first end of the first driveshaft being operatively connected to the crankshaft;
     a second driveshaft having a first end and a second end, the first end of the second driveshaft being connected to the second end of the first driveshaft, the first end of the second driveshaft being rotationally fixed relative to the second end of the first driveshaft,
     the first and second driveshafts being concentric,
     one of the first and second driveshafts being disposed at least in part inside another one of the first and second driveshafts,
     the second driveshaft extending from its first end toward the first end of the first driveshaft; and
     a third driveshaft having a first end and a second end, the first end of the third driveshaft being operatively connected to the second driveshaft; and
   a propulsion device operatively connected to the second end of the third driveshaft.

2. The marine engine assembly of claim 1, wherein the first driveshaft is disposed at least partially inside the second driveshaft.

3. The marine engine assembly of claim 1, wherein the third driveshaft is perpendicular to the first and second driveshaft.

4. The marine engine assembly of claim 3, further comprising:
   a first bevel gear mounted to the second driveshaft; and
   a second bevel gear mounted to the third driveshaft, the second bevel gear engaging and being driven by the first bevel gear.

5. The marine engine assembly of claim 4, wherein:
   the first bevel gear is disposed between the first and second ends of the second driveshaft; and
   the second bevel gear is disposed at the first end of the third driveshaft.

6. The marine engine assembly of claim 4, wherein an axis of rotation of the third driveshaft intersects an axis of rotation of the second driveshaft at a position between the first bevel gear and the first end of the second driveshaft.

7. The marine engine assembly of claim 4, further comprising:
   a first bearing rotationally supporting the first end of the second driveshaft in the housing; and
   a second bearing rotationally supporting the second end of the second driveshaft in the housing.

8. The marine engine assembly of claim 7, wherein the first bevel gear is closer to the first bearing than the second bearing.

9. The marine engine assembly of claim 7, wherein:
   the housing defines a chamber for containing lubricant; and
   the first bevel gear, the second bevel gear, the first bearing and the second bearing are disposed in the chamber.

10. The marine engine assembly of claim 9, wherein:
    the housing comprises:
      an outer housing;
      an inner housing disposed in the outer housing;
      a cover removably connected to the outer housing; and
      a gearcase connected to a bottom of the outer housing;
    the engine is connected to and is supported by the inner housing;
    the engine and the inner housing are housed in a volume defined between the outer housing and the cover;
    the inner housing is disposed at least in part between the engine and a front of the outer housing; and
    the chamber is defined by the inner housing.

11. The marine engine assembly of claim 10, wherein the third driveshaft extends in part in the chamber and in part in the gearcase.

12. The marine engine assembly of claim 1, wherein:
    the housing comprises:
      an outer housing;
      an inner housing disposed in the outer housing;
      a cover removably connected to the outer housing; and
      a gearcase connected to a bottom of the outer housing;
    the engine is connected to and is supported by the inner housing;
    the engine and the inner housing are housed in a volume defined between the outer housing and the cover; and
    the inner housing is disposed at least in part between the engine and a front of the outer housing.

13. The marine engine assembly of claim 12, wherein:
    the first and second driveshafts are disposed in the volume; and the third driveshaft extends in part in the volume and in part in the gearcase.

14. The marine engine assembly of claim 12, further comprising:
a steering actuator connected to the front of the outer housing; and
a trim actuator connected to the front of the outer housing.

15. The marine engine assembly of claim 1, wherein at least one of the first, second, and third driveshafts is perpendicular to the crankshaft.

16. The marine engine assembly of claim 15, further comprising a propulsion shaft connected to and driving the propulsion device; and
wherein:
the second end of the third driveshaft is operatively connected to the propulsion shaft;
the propulsion shaft is parallel to the crankshaft; and
the third driveshaft is perpendicular to the crankshaft and to the propulsion shaft.

17. The marine engine assembly of claim 15, wherein the third driveshaft is perpendicular to the crankshaft, to the first driveshaft and to the second driveshaft.

18. The marine engine assembly of claim 17, wherein the crankshaft and the first driveshaft are coaxial.

19. The marine engine assembly of claim 18, wherein the first end of the first driveshaft is directly connected to the crankshaft.

20. The marine engine assembly of claim 18, further comprising:
a first bevel gear mounted to the second driveshaft; and
a second bevel gear mounted to the third driveshaft, the second bevel gear engaging and being driven by the first bevel gear;
wherein:
the first driveshaft is disposed at least partially inside the second driveshaft; and
the second driveshaft extends from its first end toward the crankshaft.

21. The marine engine assembly of claim 2, wherein the second end of the second driveshaft is disposed between the first and second ends of the first driveshaft.

* * * * *